(12) United States Patent
Wong

(10) Patent No.: US 9,705,824 B2
(45) Date of Patent: Jul. 11, 2017

(54) INTELLIGENT CHASSIS MANAGEMENT

(71) Applicant: Force10 Networks, Inc., San Jose, CA (US)

(72) Inventor: David K. Wong, San Jose, CA (US)

(73) Assignee: Force10 Networks, Inc., San Jose, CA (US)

(*) Notice: Subject to any disclaimer, the term of this patent is extended or adjusted under 35 U.S.C. 154(b) by 0 days.

(21) Appl. No.: 14/622,267

(22) Filed: Feb. 13, 2015

(65) Prior Publication Data

US 2015/0156140 A1    Jun. 4, 2015

Related U.S. Application Data

(63) Continuation of application No. 12/152,952, filed on May 19, 2008, now Pat. No. 8,958,414.

(60) Provisional application No. 61/002,990, filed on Nov. 14, 2007.

(51) Int. Cl.
| | |
|---|---|
| *H04L 12/403* | (2006.01) |
| *H04L 12/931* | (2013.01) |
| *G08B 21/18* | (2006.01) |
| *H04J 3/04* | (2006.01) |
| *H04J 3/24* | (2006.01) |
| *G06F 15/16* | (2006.01) |

(52) U.S. Cl.
CPC .............. *H04L 49/40* (2013.01); *G08B 21/18* (2013.01); *H04L 12/403* (2013.01); *G06F 15/161* (2013.01); *H04J 3/047* (2013.01); *H04J 3/247* (2013.01)

(58) Field of Classification Search
CPC ............ G06F 13/4282; G06F 13/4291; G06F 1/3287; Y02B 60/34; Y02B 60/35
See application file for complete search history.

(56) References Cited

U.S. PATENT DOCUMENTS

| | | | |
|---|---|---|---|
| 6,674,751 B1 * | 1/2004 | Dittmar | ............... G06F 13/4291 370/364 |
| 2003/0014517 A1 | 1/2003 | Lindsay et al. | |
| 2004/0015733 A1 * | 1/2004 | Obara | .................... G06F 1/3209 713/300 |
| 2004/0131054 A1 | 7/2004 | Dittmar | |
| 2009/0006932 A1 | 1/2009 | Biran et al. | |
| 2009/0073481 A1 * | 3/2009 | Ferlitsch | ............ H04N 1/00896 358/1.14 |

* cited by examiner

*Primary Examiner* — Khaled Kassim
*Assistant Examiner* — Zhaohui Yang
(74) *Attorney, Agent, or Firm* — Haynes and Boone, LLP

(57) ABSTRACT

A modular system uses point-to-point communication between field-programmable gate arrays (FPGAs) on a control module and each port module, respectively, to manage basic module functions, such as power, environmental monitoring, and health checks on the modules and their components. This allows a chassis to be managed without fully powering each card first, frees processors on the modules from having to perform health checks, allows dedicated resources to rapidly monitor the health of each card, and prevents one bad card from disabling management of all cards.

20 Claims, 5 Drawing Sheets

INTELLIGENT CHASSIS MANAGEMENT

CROSS-REFERENCE TO RELATED APPLICATIONS

This is a Continuation application to U.S. Utility application Ser. No. 12/152,952, filed May 19, 2008, entitled "Intelligent Chassis Management," which in turn claims priority to co-owned, U.S. Provisional Patent Application Ser. No. 61/002,990, filed Nov. 14, 2007, entitled "Intelligent Chassis Management," the disclosures of which are incorporated herein by reference in their entirety.

BACKGROUND

1. Field of the Invention

The present disclosure relates generally to packet network devices, and more particularly to intelligent power management of a distributed platform for such a device.

2. Description of Related Art

Packet network devices such as switches and routers receive packets at a plurality of external ports, and forward those packets out other external ports, as appropriate, to advance the packets toward their network destinations. Medium-to-large switch/routers (e.g., more than 50 ports) typically employ a modular design, with a plurality of cards that plug into slots in a backplane, and communicate through the backplane.

FIG. 1 shows a high level block diagram for a modular switch/router 100, including some components thereof. The components shown include line cards LC0, LC1, LCn, router processor manager (RPM) cards RPM0, RPM1, and a backplane 110. Packets are received into and transmitted from switch/router 100 through the external ports on line cards LC0, LC1, and LCn, and are forwarded through switch/router 100 on a data plane (not shown; the data plane may include line card forwarding circuitry, which communicates through backplane signaling connections with separate switch fabric cards and/or a switch fabric on the RPMs). Within the chassis, the line cards and RPM cards pass control plane data through backplane connections that are separate from the data plane connections.

In this example, the control plane connections include a backplane Ethernet bus BPE and a backplane I$^2$C (Inter-Integrated Circuit) two-wire bus. The backplane Ethernet bus couples Ethernet ports (EP0, EP1, EPn) on the line cards with Ethernet switches (ESWR0, ESWR1) on the RPMs. The Ethernet ports connect respectively to line card processors (LCP0, LCP1, LCPn) on the line cards, and the Ethernet switches connect respectively with control card processors (RCP0, RCP1) on the RPMs. This allows the control card processors to communicate with the line card processors using appropriately addressed internal packets, in order to exchange configuration data, routing/switching updates, line card software images, and heartbeat messages.

The I$^2$C bus also connects the control card processors (RCP0, RCP1) on the RPMs with components on the line cards. For instance, software running on the control card processors can use the I$^2$C bus to poll temperature monitors (TM0, TM1, TMn) and voltage monitors (VM0, VM1, VMn), one at a time, for line card environmental statistics. Other devices on the line cards are typically monitored in similar fashion.

BRIEF DESCRIPTION OF THE DRAWINGS

The present invention can be best understood by reading the specification with reference to the following Figures, in which.

DETAILED DESCRIPTION

Figure 1:
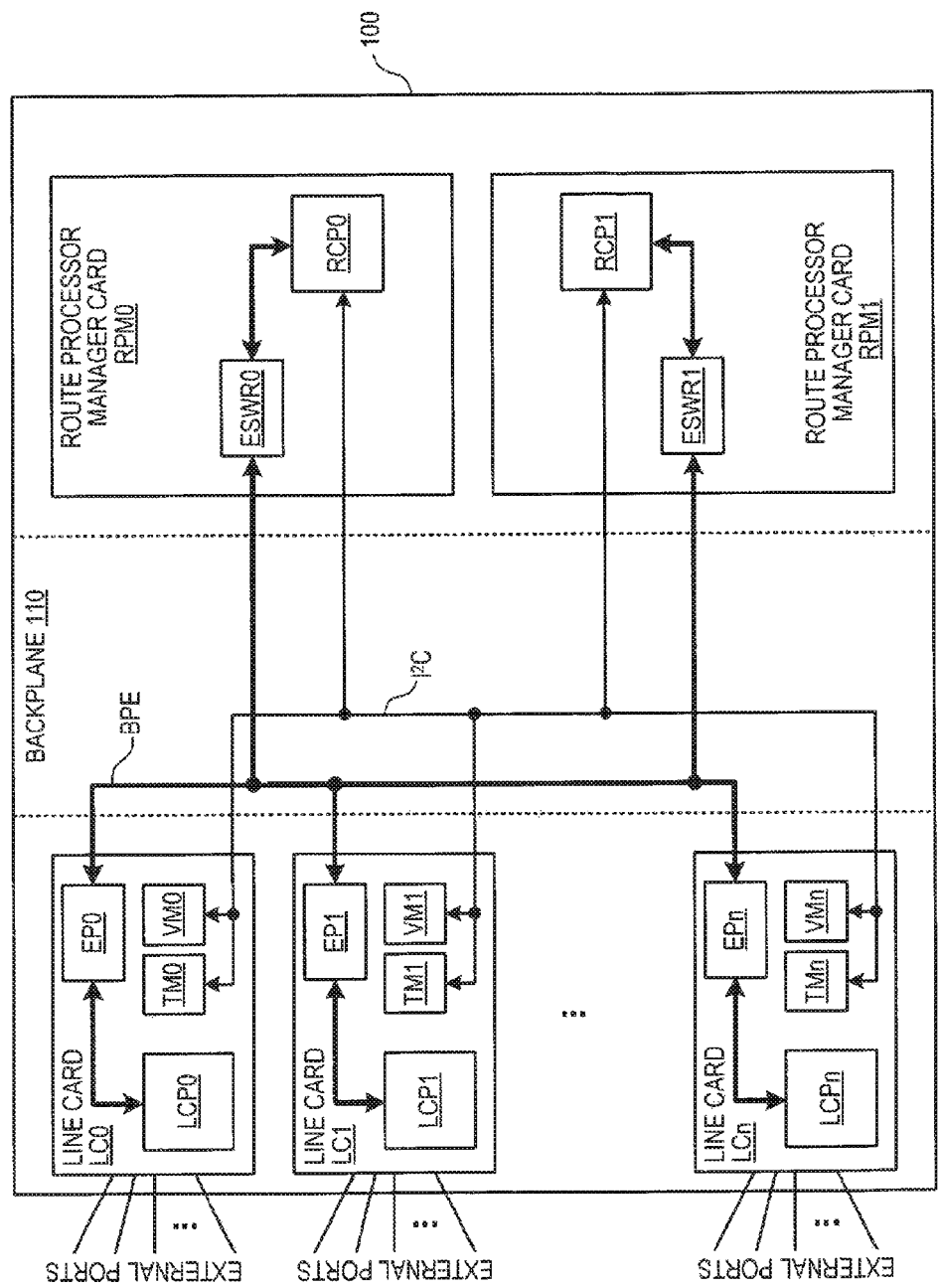
FIG. 1 contains a block diagram for a modular prior art switch.

The FIG. 1 control plane communication arrangement has now been found to have several significant drawbacks when used as described in a modular chassis. First, the use of a single management bus is unreliable, as one device malfunction on any card can cause the bus to fail for all cards sharing the bus. Second, the use of polling software on the control card processors can require a disproportionately high percentage of the control card processor CPU cycles to monitor all the devices in the chassis. Third, despite high CPU usage, this method is relatively slow to react to card failures, as a failure may not be detected until a device on the failed card is polled and the maximum response time expires. Fourth, the heartbeat messages exchanged by the line card CPUs and RPM CPUs consume additional CPU resources, and are susceptible to packet loss on the backplane Ethernet switches, leading to unnecessary line card reboots.

In the following embodiments, dedicated hardware resources such as a FPGA (Field-Programmable Gate Array) are employed on each card, with dedicated serial bus connections between each line card FPGA and each RPM FPGA (and between the RPM FPGAs). Preferably, these FPGAs receive power even when the card they serve is powered down, and automatically poll devices on their respective line cards for environmental and operational parameters. The line card FPGAs communicate with the RPM FPGAs to either push line card data to the RPMs, or respond to requests from the RPM FPGAs for such data. Although the line card FPGAs act as slaves to the RPM FPGAs, they are allowed to immediately push critical notifications to the RPM FPGAs. Also, the dedicated serial bus connections are used to exchange frequent hardware heartbeat messages, providing rapid indication of card failure/removal. In normal circumstances, the card CPUs can either ignore chassis management until notified of an event, or only intermittently monitor chassis conditions through registers on their respective FPGAs.

Figure 2:
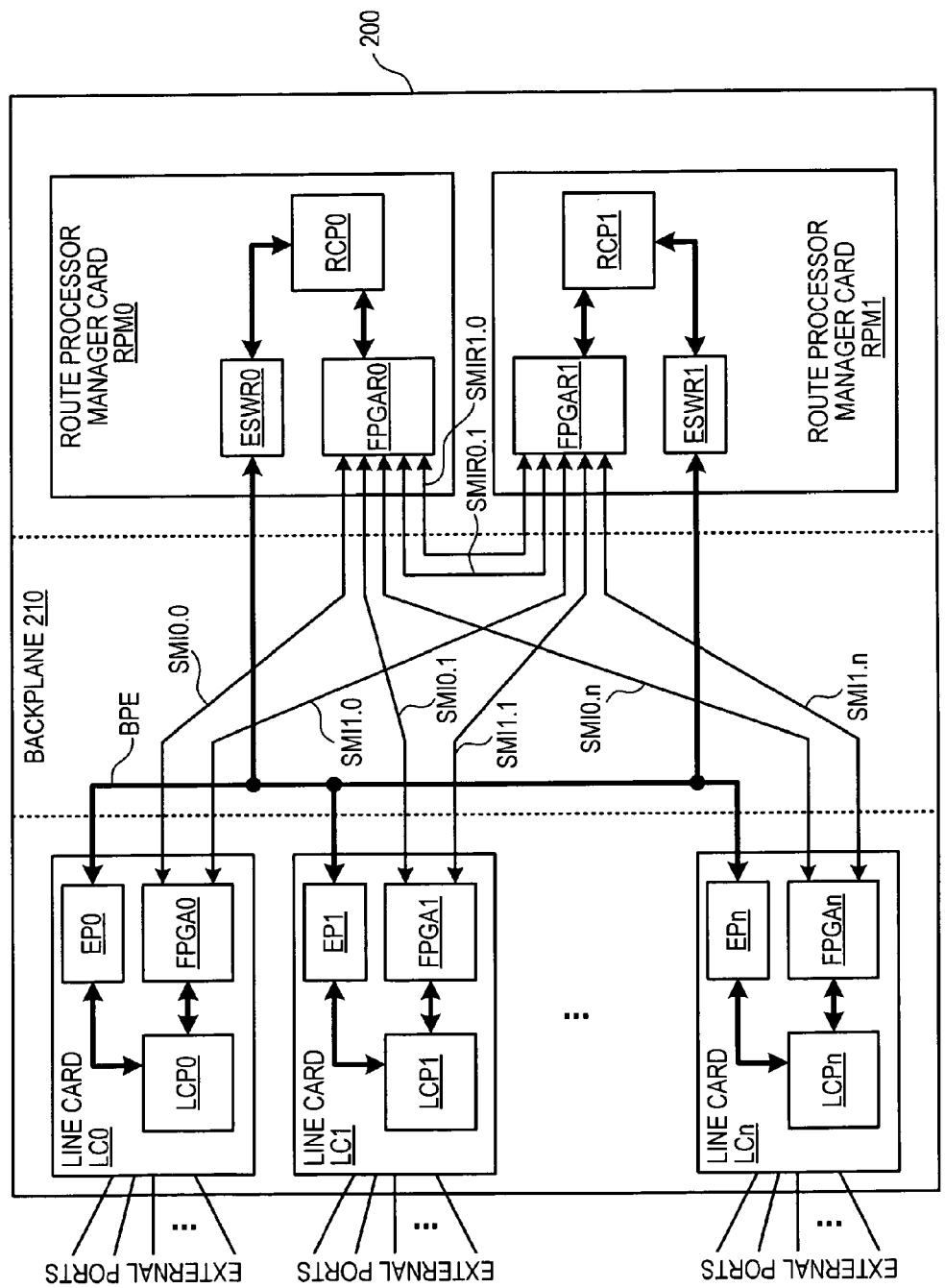
FIG. 2 contains a block diagram for a modular switch according to an embodiment.

FIG. 2 contains a block diagram for a modular packet switch 200. Similar to FIG. 1, three line cards LC0, LC1, LCn, two RPM cards RPM0, RPM1, and a backplane 210 are shown, with data plane components omitted for clarity.

Unlike FIG. 1, the FIG. 2 cards each contain an FPGA. Each line card LCi contains an FPGA FPGAi, and each RPM card RPMi contains an FPGA FPGARi. Each FPGA resides on the local bus of the control processor for the same card. The FPGAs are also linked through three-wire Serial Management Interface (SMI) buses on the backplane, with each line card FPGA FPGAi linked to each RPM FPGA FPGARj by a bus SMIj.i, with FPGARj the bus master. Likewise, the two RPM FPGAs are linked across the backplane 210 by two SMI buses, SMIR0.1 mastered by FPGAR0, and SMIR1.0 mastered by FPGAR1. Further details of an exemplary line card and RPM card are presented below.

Figure 3:
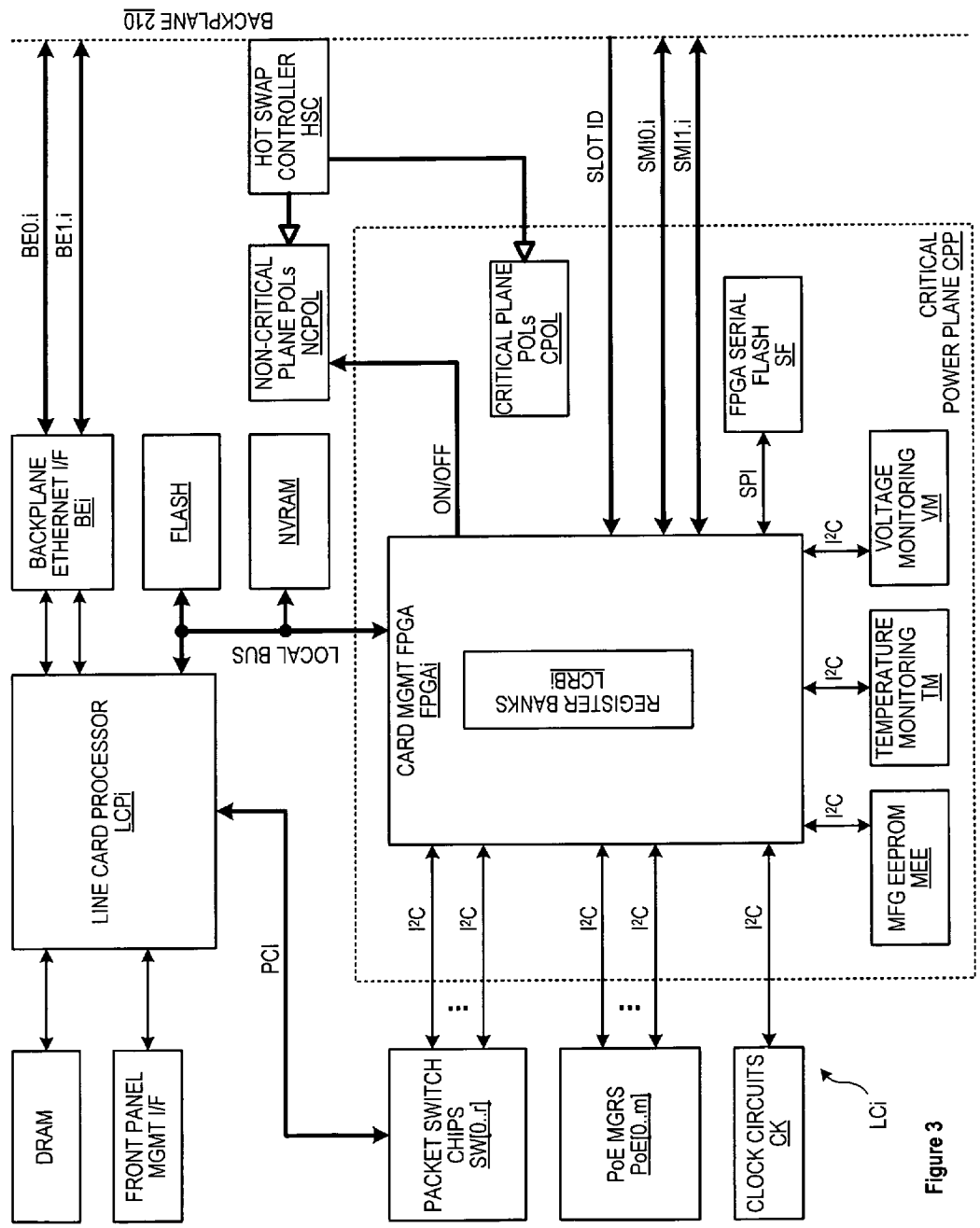
FIG. 3 contains a block diagram for a line card embodiment useful in the FIG. 2 modular switch.

FIG. 3 contains a block diagram for a line card LCi, again with data plane connections omitted for clarity. Some backplane connections are shown, including: two backplane Ethernet connections (one to each RPM card) BE0.i and BE1.i; hot swap controller HSC connections, which are used to detect when a card is being inserted or removed from a backplane slot; slot ID connections, which present a signature representative of the slot in which a card is inserted; and two backplane SMI connections (one to each RPM card) SMI0.i and SMI1.i. The other illustrated line card components are divided into those existing in a critical power plane CPP, which receive power whenever the card is inserted in a powered chassis, whether the line card is on or not, and those that are not powered when the card is not powered. The critical plane components include a card management FPGA FPGAi, critical plane POLs (Point of Load voltage converters) to supply power at voltages needed by the CPP ICs, an FPGA serial flash SF, voltage monitoring circuitry VM, temperature monitoring circuitry TM, and a manufacturing EEPROM (Electronically Erasable Programmable Read-Only Memory) MEE to store information identifying the card and card type. The non-critical plane components include non-critical plane POLs, the line card processor LCPi, its associated DRAM (Dynamic Random Access Memory), FLASH PROM, and NVRAM (Non-Volatile Random Access Memory), a backplane Ethernet interface BEi, a front panel management interface, one or more packet switch chips SW[0 . . . r], one or more PoE (Power over Ethernet, if so equipped) managers PoE[0 . . . m], and clock circuits CK. Other data path components, such as PHYs for external ports, will also typically exist but are omitted for clarity.

Upon insertion of the card into a powered chassis, or the application of power to the chassis, the hot swap controller HSC supplies power to the critical plane POLs, which in turn power up the card management FPGA. The FPGA accesses the serial flash SF across a SPI (Serial Peripheral Interface) bus to obtain a bitstream containing FPGA command and configuration data (this process also happens upon a master reset). Upon successful configuration, the FPGA begins its programmed tasks.

The card management FPGA, FPGAi, is configured with a plurality of I$^2$C interfaces. Each I$^2$C interface connects the FPGA to one or more of the line card components, such as voltage monitoring VM, temperature monitoring TM, manufacturing EEPROM MEE, packet switch chips SW[0 . . . r], PoE managers PoE[0 . . . m], or clock circuits CK. The card management FPGA acts as an I$^2$C master on each such bus, automatically accessing the local devices to monitor their condition, and storing monitored parameters locally on the FPGA in register banks LCRBi (only the critical power plane components are accessible if the line card is powered down). Because accessing these other components does not involve a card CPU, the I$^2$C busses can be relatively slow speed without impacting CPU performance. The FPGA also reads its slot ID and stores this value in register banks LCRBi.

The card management FPGA sends a startup indication to both RPM FPGAs, assuming both are operating the clock lines of their respective buses SMIj.i, notifying the RPMs that the card is alive. Upon receiving a command from the designated master RPM, via a write to a designated register in register banks LCRBi, the card management FPGA signals the non-critical plane POLs NCPOL to power up the non-critical plane components of line card LCi.

The linecard FPGA communicates regularly with the primary and secondary RPM FPGAs. If non-critical plane power is lost on the linecard, the FPGA sends an immediate, unsolicited shutdown indication to the RPM card(s) FPGA. The linecard FPGA can be programmed to upload other important indications to an RPM without delay, e.g., by issuing a write request to a register on the RPM FPGA. Such indications can include failures and failure causes, and temperature/voltage monitored values.

Another use of the FPGA upload capability is to maintain a card-to-card heartbeat. For instance, in one embodiment the master FPGA of two FPGAs communicating across an SMI bus downloads a heartbeat value to a designated register of the slave FPGA. The slave FPGA increments the heartbeat value and uploads the heartbeat value back to a designated register on the master FPGA. Assuming the master FPGA receives the expected value, it again increments the heartbeat value and downloads it again to the slave FPGA. Both FPGAs implement timers, and thus can declare a heartbeat failure when the correct heartbeat value is not returned by the expected time. The heartbeat interval and failure detection interval can be set quite short, without involving the card CPUs unless a heartbeat failure occurs. Alternately, the CPU can check the heartbeat value and update it, causing the master FPGA to initiate the next heartbeat exchange.

Downloaded values can include settings for the peripheral devices managed by the linecard FPGA. For instance, the FPGA can be instructed via download to instruct a PoE manager, across the appropriate I$^2$C bus, to turn on or off power to a PoE port.

Preferably, the line card processor LCPi couples to the card management FPGA FPGAi via a high-speed local bus. This allows FPGAi to receive additional diagnostics or parameters from LCPi, and/or for FPGAi to send additional diagnostics or parameters (regarding line card ICs or possibly the RPMs) to LCPi. FPGAi can also notify LCPi should a heartbeat failure be detected with respect to one of the RPMs.

Figure 4:
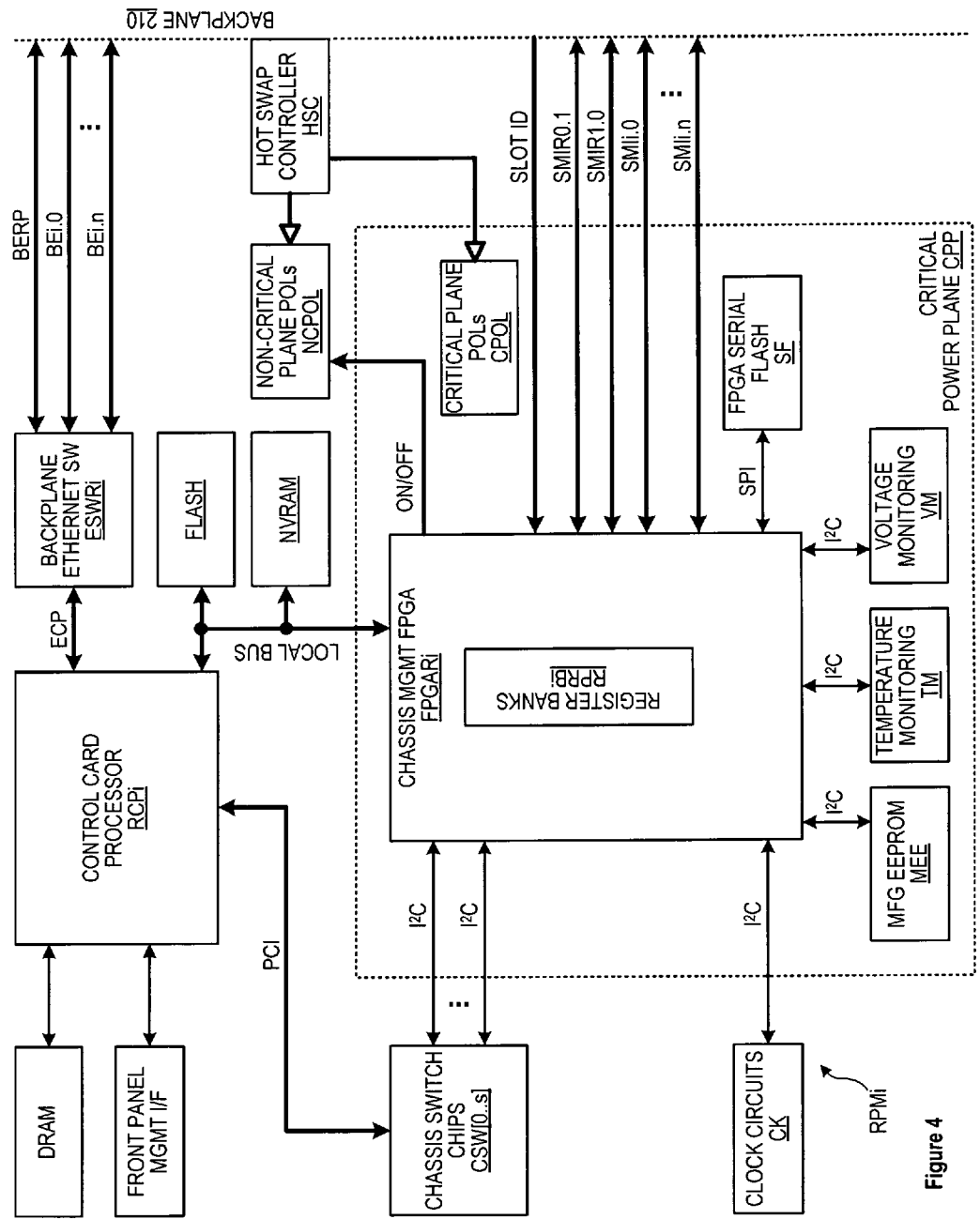
FIG. 4 contains a block diagram for a route processor card embodiment useful in the FIG. 2 modular switch.

FIG. 4 contains a block diagram for a RPM card RPMi, again with data plane connections omitted for clarity. Some backplane connections are shown, including: a backplane Ethernet connection BERP, which connects to the other RPM; backplane Ethernet connections BEi.0 to BEi.n, one for each line card; hot swap controller HSC connections, which are used to detect when a card is being inserted or removed from a backplane slot; slot ID connections, which present a signature representative of the slot in which a card is inserted; two backplane SMI connections SMIR0.1 and SMIR1.0 to the other RPM, one of which RPMi is the master and one of which RPMi is the slave; and backplane SMI connections SMIi.0 to SMIi.n, one to each line card. The other illustrated RPM card components are divided into those existing in a critical power plane CPP, which receive power whenever the card is inserted in a powered chassis, whether the RPM is on or not, and those that are not powered when the card is not powered. The critical plane components include a chassis management FPGA FPGARi, critical plane POLs (Point of Load voltage converters) to supply power at voltages needed by the CPP ICs, an FPGA serial flash SF, voltage monitoring circuitry VM, temperature monitoring circuitry TM, and a manufacturing EEPROM (Electronically Erasable Programmable Read-Only Memory) MEE to store information identifying the card and card type. The non-critical plane components include non-critical plane POLs, the control card processor RCPi, its associated DRAM (Dynamic Random Access Memory), FLASH PROM, and NVRAM (Non-Volatile Random Access Memory), a backplane Ethernet switch ESWRi, a front panel management interface, one or more chassis switch chips CSW[0 . . . s], and clock circuits CK. Other data path components and/or processors will also typically exist but are omitted for clarity.

From a control standpoint, card RPMi operates in similar fashion to line card LCi of FIG. 3. Since the RPM is expected to operate the entire chassis, however, it maintains more SMI connections and is the master on all such connections except for one connection to the other RPM, on which the other RPM is master. Chassis management FPGA FPGARi acts as an intermediary for control card processor RCPi, delivering card control instructions to the other cards as instructed, and collecting parameters from those cards. Instead of having to poll other devices on other cards (or the RPM), control card processor need only periodically read the register banks RPRBi on FPGARi to evaluate the current status of the system components. Urgent messages from another FPGA, loss of a heartbeat, etc., can prompt FPGARi to interrupt RCPi for prompt handling.

Figure 5:
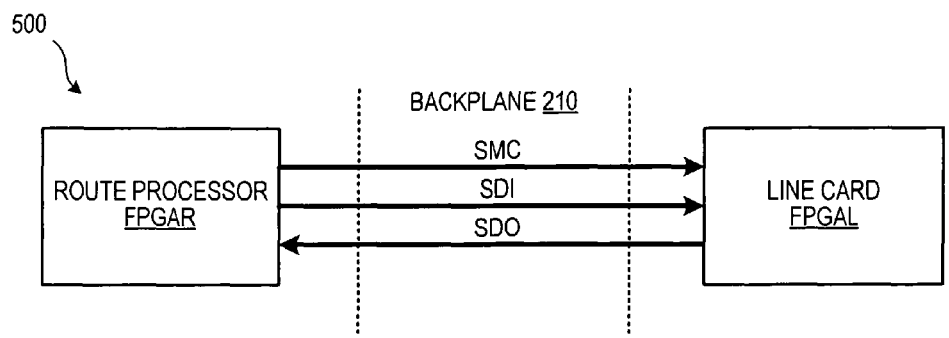
FIG. 5 shows a typical bus arrangement between a route processor module and a line card in an embodiment.

FIG. 5 contains a block diagram 500, illustrating the SMI connections between a route processor FPGA FPGAR and a line card FPGA FPGAL. Each SMI connection comprises three single-ended unidirectional signal paths SMC, SDI, and SDO (and a common digital ground path, not shown) connected through backplane 210. FPGAR is the master of the bus, and thus transmits a clock signal on SMC. The clock signal can range up to a maximum programmable clock frequency of 50 MHz. The clock signal is used by both FPGAR and FPGAL to send and receive data frames. FPGAR drives data frames to FPGAL on serial data in line SDI; FPGAL drives data frames to FPGAR on serial data out line SDO.

Figure 6:
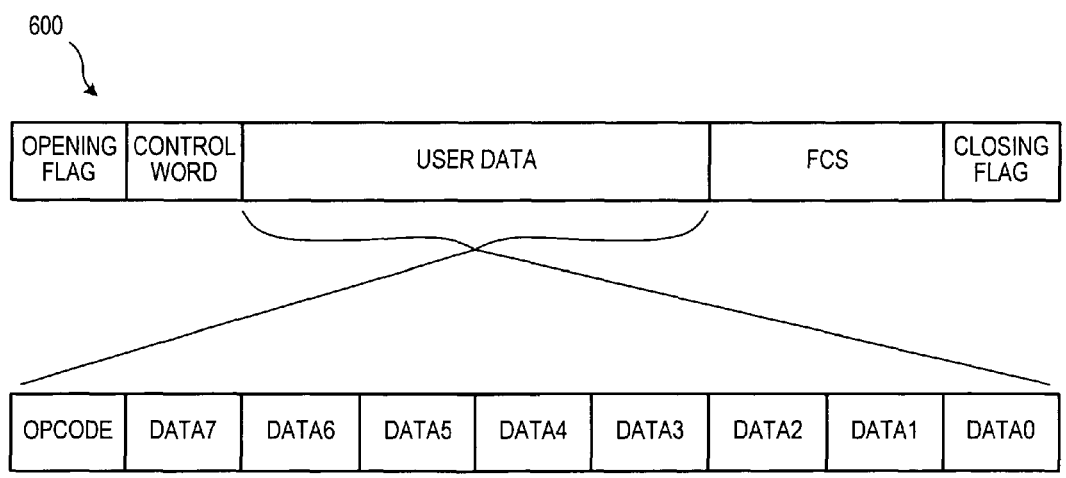
FIG. 6 depicts a packet format used in an embodiment for communication between the modules of the FIG. 2 switch.

When either FPGAR or FPGAL communicates with its peer, it sends a 14-octet frame with the frame format 600 shown in FIG. 6. Opening and closing flags having a defined bit pattern delineate the packet beginning and ending. The opening flag is followed by a control word, which can take a fixed value unless additional complexity is desired. Nine octets of user data, including an operation code (opcode) and eight octets of data, follow the control word. A two-octet frame check sequence FCS follows the user data, and allows the receiver to validate that it received the frame correctly.

The opcodes used in a given chassis can be tailored to the application. For instance, in one embodiment two opcodes are set aside to transmit startup and shutdown indications. The startup indication frame is transmitted by a FPGA that has just been powered up or reset, to alert its peer that it is ready to communicate. A shutdown indication frame alerts the peer that non-critical power has been shutdown on the card, leaving the FPGA and other critical power plane components as the only operational components of the card.

Two opcodes are assigned to a read operation on a peer FPGA register. The FPGA desiring to read remote data issues a read request frame, identifying the address of the desired register. The FPGA receiving such a request reads the desired register, and supplies the value in a read response frame to the requester.

Two opcodes are assigned to a write operation on a peer FPGA register. The FPGA desiring to write remote data issues a write request frame, identifying the address of the desired register and the value to be written. The FPGA receiving such a request writes the desired register, if a write is allowed, or disregards the request. In either case, the receiving FPGA issues a write response to the requester, indicating either success or failure for the write operation. The receiving FPGA may also trigger some other operation (for example, a heartbeat update) upon receiving a write request.

For convenience, other opcodes can be defined for diagnostic purposes. For instance, two opcodes can be used to enable and disable loop-back paths in the peer, allowing an FPGA to evaluate the integrity of the round-trip SMI pathway and possibly isolate a fault. An opcode can also be defined as a response to a frame with an invalid or unknown opcode, or a corrupted frame.

Various features of the embodiments can be combined in ways other than those shown to create alternate embodiments having greater, fewer, or different capabilities than those illustrated. Bus types and bus protocols are exemplary, and can be adapted to individual situations. Although FPGAs are described as the cooperating card monitoring devices, other hardware devices with similar functionality can be substituted in a given embodiment, and/or multiple cooperating devices can be used on a card to implement the functionality. Although the exemplary embodiments show a chassis management card and a packet line card, the embodiments described herein are applicable to other modular-chassis systems as well.

Although the specification may refer to "an", "one", "another", or "some" embodiment(s) in several locations, this does not necessarily mean that each such reference is to the same embodiment(s), or that the feature only applies to a single embodiment.

What is claimed is:

1. A networking device, comprising:
   a line module that includes:
      a plurality of external network ports that are configured to send and receive data packets through a network;
      a line processor that is coupled to the plurality of external network ports; and
      a line dedicated hardware resource that is coupled to the line processor, wherein the line dedicated hardware resource is configured to receive power when the line processor is powered down and monitor a plurality of components that are included in the line module without involvement of the line processor;
   a route module that is configured to perform route processing of data packets received by the line module through the network, wherein the route module includes:
      a route processor; and
      a route dedicated hardware resource that is coupled to the route processor, wherein the route dedicated hardware resource is configured to receive power when the route processor is powered down; and
   a point-to-point connection between the route dedicated hardware resource and the line dedicated hardware resource, wherein the route dedicated hardware resource is configured to transmit, over the point-to-point connection to the line dedicated hardware resource, a clock signal that is used by the route dedicated hardware resource and the line dedicated hardware resource to transmit control plane data over the point-to-point connection while at least one of the route processor and the line processor are powered down.

2. The networking device of claim 1, wherein the point-to-point connection includes a first unidirectional signal path that is configured to transmit the clock signal, a second unidirectional signal path that is configured to transmit the control plane data from the route dedicated hardware resource to the line dedicated hardware resource, and a third unidirectional signal path that is configured to transmit the control plane data from the line dedicated hardware resource to the route dedicated hardware resource.

3. The networking device of claim 1, wherein the line dedicated hardware resource is configured to transmit, over the point-to-point connection to the route dedicated hardware resource, the control plane data that includes a data frame with an operation code that is indicative of one of:
 a startup of the line dedicated hardware resource subsequent to a power up or reset of the line dedicated hardware resource such that the line dedicated hardware resource is ready to communicate; and
 a shutdown of the line module such that the line processor is not receiving power while the line dedicated hardware resource is receiving power.

4. The networking device of claim 1, wherein the line dedicated hardware resource is configured to transmit, over the point-to-point connection to the route dedicated hardware resource, the control plane data that includes a first data frame with an operation code that is indicative of a request to read data from an address of a register in the route module.

5. The networking device of claim 4, wherein the route dedicated hardware resource is configured to send, over the point-to-point connection to the line dedicated hardware resource, the control plane data that includes a second data frame with an operation code that is indicative of a value that was read from the address of the register in the route module, along with the value that was read.

6. The networking device of claim 1, wherein the line dedicated hardware resource is configured to transmit, over the point-to-point connection to the route dedicated hardware resource, the control plane data that includes a first data frame with an operation code that is indicative of a request to write data to an address of a register in the route module, along with a value to be written.

7. The networking device of claim 6, wherein the route dedicated hardware resource is configured to transmit, over the point-to-point connection to the line dedicated hardware resource, the control plane data that includes a second data frame with an operation code that is indicative of a success or a failure in writing the value to the address of the register in the route module.

8. A networking device, comprising:
 a plurality of line cards that each include:
  a plurality of external network ports that are configured to send and receive data packets through a network;
  a line processor that is coupled to the plurality of external network ports; and
  a line Field Programmable Gate Array (FPGA) that is coupled to the line processor, wherein the line FPGA is configured to receive power when the line processor is powered down and monitor a plurality of components that are included in its line card without involvement of the line processor;
 a route processor manager (RPM) card that is configured to perform route processing of the data packets received by the plurality of line cards through the network, wherein the RPM card includes:
  a route processor; and
  a route FPGA that is coupled to the route processor, wherein the route FPGA is configured to receive power when the route processor is powered down; and
  a dedicated serial bus connection between the route FPGA and each respective line FPGA, wherein the route FPGA is configured to transmit, over each of the dedicated serial bus connections to each respective line FPGA, a clock signal that is used by the route FPGA and each respective line FPGA to transmit control plane data over the dedicated serial bus connection while at least one of the route processor and the line processor are powered down.

9. The networking device of claim 8, wherein each dedicated serial bus connection includes a first unidirectional signal path that is configured to transmit the clock signal, a second unidirectional signal path that is configured to transmit the control plane data from the route FPGA to the line FPGA connected to that dedicated serial bus connection, and a third unidirectional signal path that is configured to transmit the control plane data from the line FPGA connected to that dedicated serial bus connection to the route FPGA.

10. The networking device of claim 8, wherein each line FPGA is configured to transmit, over its dedicated serial bus connection to the route FPGA, the control plane data that includes a data frame with an operation code that is indicative of one of:
 a startup of that line FPGA subsequent to a power up or reset of that line FPGA such that that line FPGA is ready to communicate; and
 a shutdown of the line card that includes that line FPGA such that the line processor on that line card is not receiving power while that line FPGA is receiving power.

11. The networking device of claim 8, wherein each line FPGA is configured to transmit, over its dedicated serial bus connection to the route FPGA, the control plane data that includes a first data frame with an operation code that is indicative of a request to read data from an address of a register in the RPM card.

12. The networking device of claim 11, wherein the route FPGA is configured to transmit, over each dedicated serial bus connection to each respective line FPGA, the control plane data that includes a second data frame with an operation code that is indicative of a value that was read from the address of the register in the RPM card, along with the value that was read.

13. The networking device of claim 8, wherein each line FPGA is configured to, over its dedicated serial bus connection to the route FPGA, the control plane data that includes a first data frame with an operation code that is indicative of a request to write data to an address of a register in the RPM card, along with a value to be written.

14. The networking device of claim 13, wherein the route FPGA is configured to transmit, over each dedicated serial bus connection to each respective line FPGA, the control plane data that includes a second data frame with an operation code that is indicative of a success or a failure in writing the value to the address of the register in the RPM card.

15. A method for managing a networking device, comprising:
 powering a line dedicated hardware resource in a line module while a line processor in the line module is powered down, wherein the line module includes a plurality of external network ports that are coupled to the line processor and that are configured to send and receive data packets through a network;
 powering a route dedicated hardware resource in a route module while a route processor in the route module is powered down, wherein the route module is configured to perform route processing of data packets received by the line module through the network monitoring, using the line dedicated hardware resource, a plurality of components that are included in the line module without involvement of the line processor;

transmitting, by the route dedicated hardware resource, a clock signal over a point-to-point connection between the line dedicated hardware resource and the route dedicated hardware resource; and transmitting, by each of the route dedicated hardware resource and the line dedicated hardware resource, control plane data over the point-to-point connection using the clock signal.

16. The method of claim 15, further comprising:

transmitting the clock signal from the route dedicated hardware resource to the line dedicated hardware resource over a first unidirectional signal path that is included in the point-to-point connection;

transmitting the control plane data from the route dedicated hardware resource to the line dedicated hardware resource over a second unidirectional signal path that is included in the point-to-point connection; and transmitting the control plane data from the line dedicated hardware resource to the route dedicated hardware resource over a third unidirectional signal path that is included in the point-to-point connection.

17. The method of claim 15, further comprising:

transmitting, by the line dedicated hardware resource over the point-to-point connection to the route dedicated hardware resource, the control plane data that includes a data frame with an operation code that is indicative of one of:

a startup of the line dedicated hardware resource subsequent to a power up or reset of the line dedicated hardware resource such that the line dedicated hardware resource is ready to communicate; and a shutdown of the line module such that the line processor is not receiving power while the line dedicated hardware resource is receiving power.

18. The method of claim 15, further comprising:

transmitting, by the line dedicated hardware resource over the point-to-point connection to the route dedicated hardware resource, the control plane data that includes a first data frame with an operation code that is indicative of a request to read data from an address of a register in the route module.

19. The method of claim 18, further comprising:

transmitting, by the route dedicated hardware resource over the point-to-point connection to the line dedicated hardware resource, the control plane data that includes a first data frame with an operation code that is indicative of a value that was read from the address of the register in the route module, along with the value that was read.

20. The method of claim 15, further comprising:

transmitting, by the line dedicated hardware resource over the point-to-point connection to the route dedicated hardware resource, the control plane data that includes a first data frame with an operation code that is of a request to write data to an address of a register in the route module, along with a value to be written; and transmitting, by the route dedicated hardware resource over the point-to-point connection to the line dedicated hardware resource, the control plane data that includes a second data frame with an operation code that is indicative of a success or a failure in writing the value to the address of the register in the route module.

* * * * *